(12) United States Patent
Hrabik et al.

(10) Patent No.: US 7,370,359 B2
(45) Date of Patent: *May 6, 2008

(54) METHOD AND APPARATUS FOR VERIFYING THE INTEGRITY AND SECURITY OF COMPUTER NETWORKS AND IMPLEMENTING COUNTER MEASURES

(75) Inventors: Michael Hrabik, Omaha, NE (US); Jeffrey Guilfoyle, Omaha, NE (US); Edward Mac Beaver, Omaha, NE (US)

(73) Assignee: Solutionary, Inc., Omaha, NE (US)

( * ) Notice: Subject to any disclaimer, the term of this patent is extended or adjusted under 35 U.S.C. 154(b) by 512 days.

This patent is subject to a terminal disclaimer.

(21) Appl. No.: 11/070,022

(22) Filed: Mar. 2, 2005

(65) Prior Publication Data

US 2005/0204404 A1    Sep. 15, 2005

Related U.S. Application Data

(63) Continuation of application No. 10/196,472, filed on Jul. 16, 2002, now Pat. No. 6,988,208, which is a continuation-in-part of application No. 09/770,525, filed on Jan. 25, 2001, now Pat. No. 7,168,093.

(51) Int. Cl.
*H06F 21/24* (2006.01)
*H06F 21/00* (2006.01)

(52) U.S. Cl. .......................... 726/23; 726/22; 726/25; 713/189

(58) Field of Classification Search .................... None
See application file for complete search history.

(56) References Cited

U.S. PATENT DOCUMENTS 7,181,769 B1 *  2/2007  Keanini et al. ............... 726/23
7,215,637 B1 *  5/2007  Ferguson et al. ......... 370/230.1
7,260,844 B1 *  8/2007  Tidwell et al. ............... 726/22

* cited by examiner

*Primary Examiner*—Syed A. Zia
(74) *Attorney, Agent, or Firm*—Ostrolenk, Faber, Gerb & Soffen, LLP (57) ABSTRACT

A method and apparatus for verifying the integrity of devices on a target network. The apparatus has security subsystems and a master security system hierarchically connected to the security subsystems via a secure link. The target network includes various intrusion detection devices, which may be part of the security subsystem. Each intrusion detection device generates a plurality of event messages when an attack on the network is detected. The security subsystem collects these event messages, correlates, and analyzes them, and performs network scanning processes. If certain events warrant additional scrutiny, they are uploaded to the master security system for review.

17 Claims, 4 Drawing Sheets

METHOD AND APPARATUS FOR VERIFYING THE INTEGRITY AND SECURITY OF COMPUTER NETWORKS AND IMPLEMENTING COUNTER MEASURES

CROSS-REFERENCE TO RELATED APPLICATIONS

This application is a continuation of U.S. patent application Ser. No. 10/196,472, filed Jul. 16, 2002, which is a continuation-in-part of U.S. patent application Ser. No. 09/770,525, filed Jan. 25, 2001 now U.S. Pat. No. 7,168,093, and claims all rights of priority thereto.

FIELD OF THE INVENTION

This invention relates to a method and apparatus for verifying the integrity of a computer security subsystem for preventing attacks on computer network security systems.

BACKGROUND OF THE INVENTION

Concurrent with the rise in connectivity among diverse computer networks and the corresponding increase in dependence on networked information systems, there has been a dramatic increase in the need for robust security to enforce restrictions on access to and prevent intrusion on secure systems. The topology of the interconnected networks has also grown increasingly complex, and often involves open networks such as the internet or the extranet that expose secure systems to increased threats of attack. Consequently, no single solution has yet been proposed that addresses all current needs for intrusion detection, intrusion prevention and response. Instead, a vast assortment of security devices and techniques has evolved and has generally been implemented differently on individual systems. This has resulted in a global security patchwork, inherently susceptible to attack and to individual systems which themselves implement a hodge podge of different security devices and techniques.

Attempts to gain unauthorized access to computer networks capitalize on inherent loopholes in a network's security topology. It is known, for example, that although a secure system connected to the internet may include firewalls and intrusion detection systems to prevent unauthorized access, weaknesses in individual security components are often sought out and successfully exploited. The rapid introduction of new technology exacerbates the problem, creating or exposing additional weaknesses that may not become known even after a breach in security has already occurred. Some currently available intrusion tools allow an intruder to evade detection by intrusion detection systems.

Figure 1:
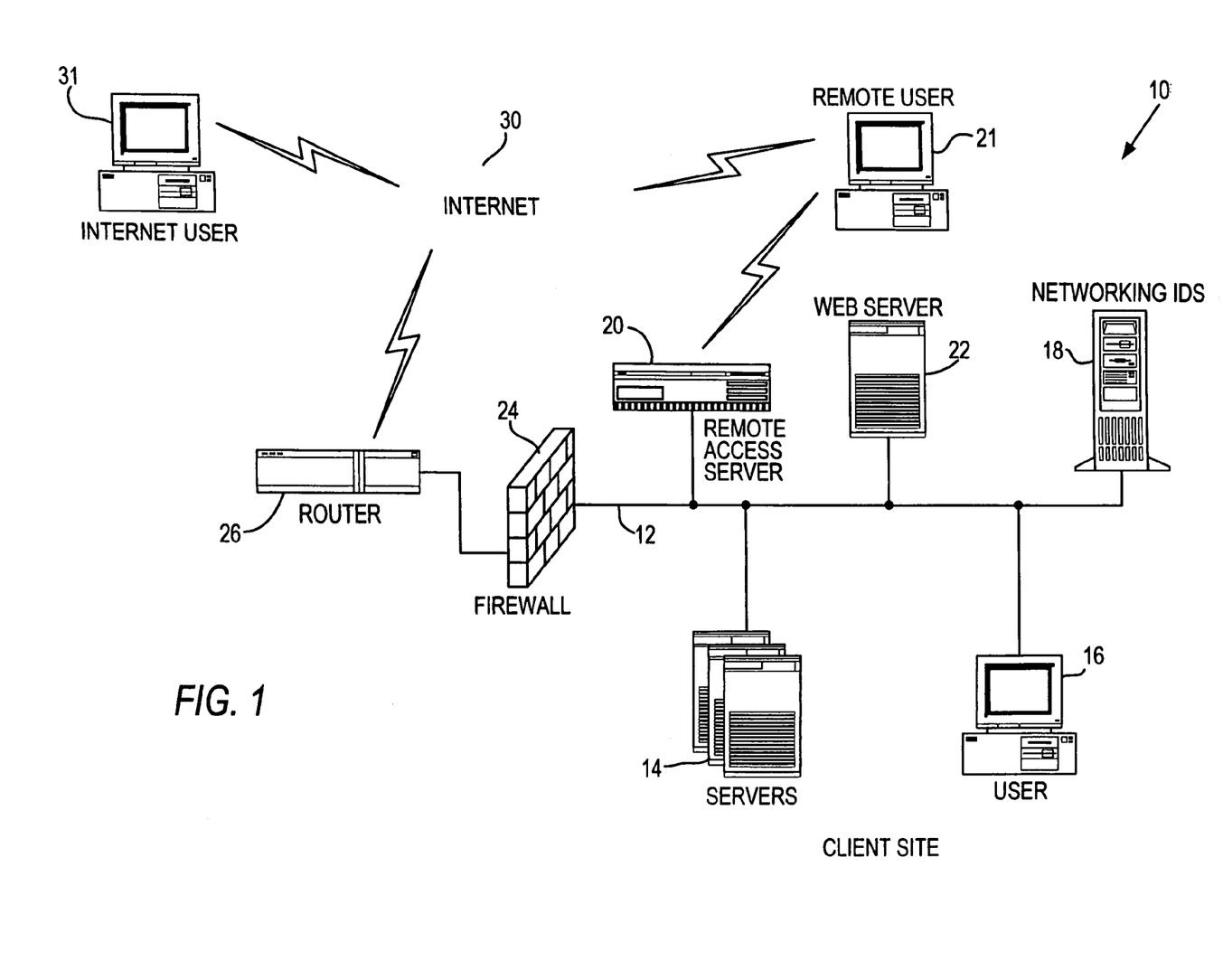
FIG. 1 is a block diagram showing the overall structure of an example of a network system according to the prior art.

A fundamental weakness shared in common by current intrusion detection and response systems is their "flat" or non-hierarchical implementation. The configuration shown in FIG. 1 is an example of such a typical network implementation on a hypothetical "target network." The network 10 includes a plurality of file servers 14, workstations 16, a network intrusion detection system (IDS) 18, a remote access server 20 and a web server 22. These devices are connected to each other over a network backbone 12, and form a local or wide-area network (LAN or WAN, respectively). Router 26 is connected directly to an open network such as the internet, 30, and is connected to the devices on the network backbone 12 through a network firewall 24.

The firewall 24 and the IDS 18 are part of the security system of network 10. Firewall 24 is configurable and serves to control access by hosts on the internet to resources on the network. This protects network 10 from intruders outside the firewall, essentially by filtering them out. IDS 18 scans packets of information transmitted over backbone 12 and is configured to detect specific kinds of transactions that indicate that an intruder is attempting, or already has gained access to the network, 10. In this way, the IDS detects intruders inside as well as outside the firewall. Other devices on network 10 may also contribute to network security, such as remote access server 20 which permits access directly to network 10 from remote computers (not shown), for example, over a modem. Remote access server 20 must also implement some security function such as username and password verification to prevent intruders from gaining access to the network and bypassing firewall 24.

In a typical intrusion scenario on a target network connected to the internet, an intruder will first learn as much as possible about the target network from available public information. At this stage, the intruder may do a "whois" lookup, or research DNS tables or public web sites associated with the target. Then, the intruder will engage in a variety of common techniques to scan for information. The intruder may do a "ping" sweep in order to see which machines on the target network are running, run a port-map to determine the services available on the network, or they may employ various scanning utilities well known in the art such as "rpcinfo", "showmount" or "snmpwalk" to uncover more detailed information about the target network's topology. At this stage the intruder has done no harm to the system, but a correctly configured network IDS should be able, depending on its vantage point on the network, to detect and report surveillance techniques of intruders that follow known patterns of suspicious activity. These static definitions, known as "intrusion signatures", are effective only when the intruder takes an action or series of actions that closely follow the established definitions of suspicious activity. Consequently, if the IDS is not updated, is disabled, evaded or encounters an unknown or new method of attack, it will not respond properly. However, if steps are not taken at this point in the attack to prevent further penetration into the target network, the intruder may actually begin to invade the network, exploiting any security weaknesses (such as the IDS that may have not reacted earlier to the intruder), and securing a foothold on the network. Once entrenched, the intruder may be able to modify or disable any device belonging to the target network including any remaining IDS or firewall.

Methods used by intruders to gain unauthorized access to computer networks evolve in sophistication in lock step with advances in security technology. It is typical, however, that successful attacks on network systems often begin by attacking the security subsystems in place on the target network that are responsible for detecting common intrusion signatures, disabling those systems and destroying evidence of the intrusion.

U.S. Pat. No. 5,916,644 to Kurtzberg et al. discloses a method for testing the integrity of security subsystems wherein a specifically configured system connected directly to a target computer network will systematically test security on the network by simulating attacks on security devices in order to verify that they are operational. Specifically, the disclosed method randomly simulates an attack on the network. If the attack is detected, the security subsystems are assumed to be functioning. If not, they are considered compromised, and an attack may already be underway. This method is an improvement over passive systems that do not check themselves and therefore cannot properly report on their own status when they have been disabled.

A major shortcoming of this approach is that these security systems reside on the same networks that they seek to protect and are similarly vulnerable to attack once an intruder has gotten a foothold on the network. In other words, they are not themselves immune to the attacks of intruders. As a result each advance in the prior art is just another new security hurdle on the network to be defeated. Additionally, by only testing security from a single location, they will likely not detect a 'filtered' detection system, whereby only specific events are not reported. This can allow a compromised system to still function within the specified parameters. In this light, the active scanning approach disclosed in Kurtzberg is not fundamentally different from any other security measure (such as firewall) in that it is non-hierarchical and depends completely on the vigilance of a human network manager.

Therefore, there exists a need for a self-diagnosing network security system that can protect a target network from both internal and external intruders and that is resistant to attacks perpetuated on the system it has been deployed to protect. Furthermore, there is a need for an active security system that will take measured action against perceived security threats even in the absence of a human network manager.

Further, with the ability of a single IDS sensor to create hundreds of thousands of events, many companies find it impossible to effectively monitor and prioritize the constant stream of alerts. Some companies respond by reducing the sensitivity of the IDS, making for fewer alerts and less stress on their staff. However, this often has an undesired effect: it diminishes the ability of an IDS to detect real threats, resulting in a high rate of false negatives. Thus, there is a need for a security system capable of sorting through multiple event messages and concentrating on the events that pose a security risk.

Government regulations and client demands are prompting more companies to conduct Internet security assessments, from comprehensive perimeter assessments to focused penetration tests. Internal scans, vulnerability assessments, server assessments and hardening are elements of a comprehensive e-security strategy. However, they do a poor job of assessing the weakest link in security, i.e., a company's connection to the Internet. Thus, there is a need in the industry for Internet-based assessment and monitoring to protect resources that interact with customers, employees and partners over the Internet.

SUMMARY OF THE INVENTION

It is therefore an object of the present invention to provide a network security system for a network of computers that is capable of solving the above mentioned problems in the prior art.

It is another object of the present invention to provide a network security system which can analyze a steady stream of detected events and combine and prioritize them into a small number of security alerts.

It is another object of the present invention to provide a network security system that has a component that can directly monitor and correlate multiple network security devices on a network for attack signatures and other suspicious network activity suggesting an attempt to compromise security on that network.

It is another object of the present invention to provide a network security system that can dynamically detect new patterns or trends in network activity that suggests an attempt to compromise network security on a single network or on a plurality of otherwise unrelated networks.

It is another object of the present invention to provide a network security system that can detect, examine, and respond to security trends and patterns across multiple enterprises.

It is another object of the present invention to provide a security system enabling integrity verification for security devices on a network, and can also reliably verify its own integrity.

It is another object of the present invention to provide a security system for a computer network that can take corrective measures after an attack has been detected to prevent an intruder from gaining further access to the network.

It is another object of the present invention to assess the likelihood or impact of an attack by comparing the baseline system information (system configuration, last assessment results, attack history, etc.) to the specific details of the attack.

It is another object of the present invention to provide a security system satisfying the above objectives for individual computers connected to an open network.

According to an example of the present invention, there is provided a network security system to prevent intrusion on a target network having at least one security subsystem local to the target network provided to monitor network traffic and to detect attacks by an intruder on the system. The subsystem detects unusual patterns and/or anomalies by examining security-related events from servers, firewalls, routers, IDSs, physical security systems, or other event detection mechanisms. The subsystem is connected via a secure link to a master system that is not otherwise connected to the target system. The master system monitors the subsystem via the secure link, registers information pertaining to the status of the subsystem and analyzes events which are determined by the subsystem to pose a threat to the target network. Any anomalies in the enterprise, global traffic and activity across the target network are reported to the master system for evaluation and analysis.

If the subsystem detects an attack on the target network, or does not respond to the master system, the master system will take appropriate action, ranging from logging the incident or notifying a network manager to attempting to shut down access to the network. Accordingly, even attacks that completely disable the subsystem will not prevent the master system from responding.

According to another example of the present invention, a multi-level hierarchy is implemented making the subsystem subordinate to the master system. In this configuration, commands can only be passed from the master system to the subsystem, ensuring that the integrity of the master system can not be undermined, even if by successful attacks on the target network, or on the subsystem itself. Therefore, even a subversion of the subsystem and a compromised link between it and the master system is insufficient to disable the master system. The multi-level hierarchy system may utilize more than one subsystem connected to the target network. These multiple subsystems are hierarchically arranged so as to delegate some of their more complicated duties to a higher level subsystem and to pass commands to a lower level subsystem, providing scaleable performance and an ability to respond to huge increases in event volume.

According to another example of the present invention, a pseudo-attack generator associated with the master system is provided that simulates attacks on the target network that should be detected by the subsystem. By comparing the pseudo-attacks made on the target network to the attacks actually detected by the subsystem, the master system can determine whether the integrity and effectiveness of the subsystem has been compromised. Similarly, the subsystem may generate its own pseudo-attacks on other network security components to establish their integrity as well. Therefore, it is possible to test comprehensively every security-related device connected to the target network.

Additionally, the pseudo-attack generator creates a 'fingerprint' of the attack patterns, and expects to receive notification of the attack from the monitored devices in a specific order within a specific timeframe. This allows the system to detect if another attacker is 'masquerading' as the master system, attempting to perform attacks as if it were the master system itself.

In accordance with another example of the present invention, the subsystem and/or the master system conducts regular vulnerability assessments of all devices on the target network. Vulnerability assessments determine which types of attacks can be effective against a particular network device. Assessed vulnerability information can then be used to prioritize security events. The subsystem may conduct an internal assessment which examines all aspects of systems and procedures implemented on the target network, for example, general security practices, network vulnerability, firewall and IDS readiness, encryption strategy, access control (logical and physical), and virus protection. The master system may conduct an external assessment, which evaluates routers, firewalls, servers and other target network devices in order to uncover any bugs, vulnerabilities, configuration changes or human errors that could create opportunities for unauthorized access to the target network, systems and information assets. The master system also safeguards possible break-in points formed by the increasing use of insecure remote access systems. Either the subsystem or the master system can perform a series of scans to uncover weaknesses and/or holes in the security protection of the target network and systems. The system also directly queries monitored systems for their version and configuration information, detecting system compromise that may otherwise go undetected. These scans may be performed on a regular basis (e.g., hourly) or may be triggered by a detected security event.

In a further example of the present invention, the master system uses a process of baselining to determine a target network's "fingerprint," i.e., the specific view of the target network from the Internet or from the inside of the network. Based on the created "fingerprint," any time a server, services, port or protocol is opened or closed through the firewall or server, the master system can generate a security alert or action, which is then analyzed by the master system.

In another example of the present invention, the master system and the subsystem provide a comprehensive assessment of information sources involved in network connectivity, from the root domain name servers through the web server(s) located on the target network.

In another example of the present invention, the subsystem, and the master system acting through the subsystem, can implement corrective measures to mitigate or thwart suspected intruder attacks on the target network.

The above and other objects, aspects, features and advantages of the invention will be more readily apparent from the description of the preferred embodiments thereof taken in conjunction with the accompanying drawings and appended claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION

The preferred embodiments of a network security system according to the present invention will hereinafter be described with reference to the accompanying drawings.

Figure 2:
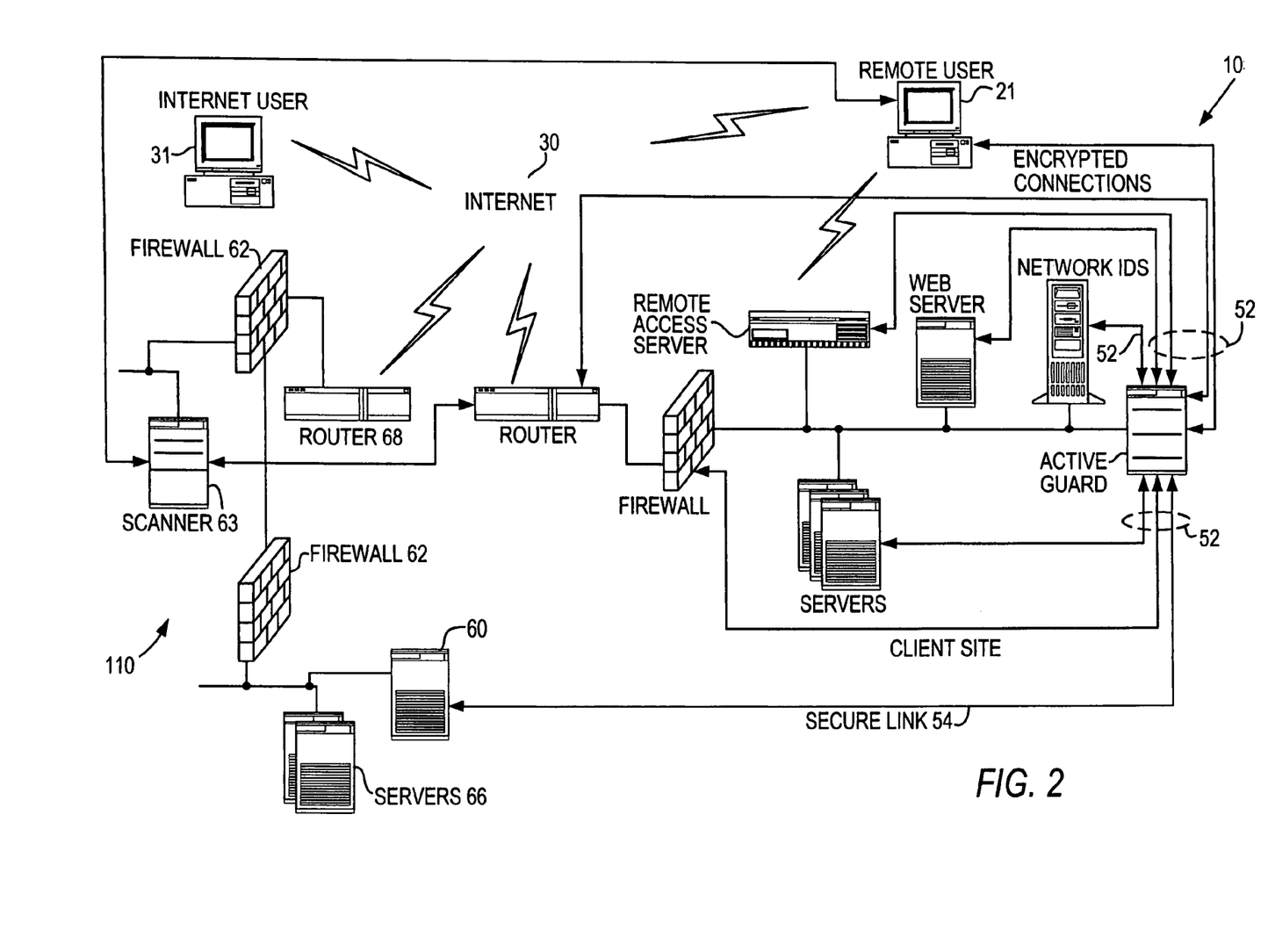
FIG. 2 is a block diagram showing an example of a network incorporating the system of the present invention.

Referring to FIG. 2, a first embodiment of the present invention is shown. Target network 100 is shown having the same basic components as the network of the prior art shown in FIG. 1 with the addition of security subsystem 50, however, it should be noted that the actual configuration of the target network is not critical with the exception of at least one security subsystem 50. Each of the security subsystem 50, servers 14, workstations 16, IDS 18, remote access server 20, web server 22, firewall 24 and router 26 are connected together over network backbone 12. Each of the devices carry out communication over the backbone in accordance with a predetermined communication protocol such as Transmission Control Protocol/Internet Protocol (TCP/IP). Security subsystem 50, firewall 24, IDS 18, and all servers, routers, IDSs, and other monitored devices are considered detecting means for detecting if security is compromised.

Target network 100 is connected through firewall 24 and router 26 to the internet 30 as well as through remote access server 20 which may also be selectively connected to the internet 30 through remote user 21. These two potential points of contact with an open network, in this case the internet, exposes target network 100 to the threat of intrusion from any host with access to the internet such as internet user 31. In addition to threats from the outside, those with direct access to the resources of target network 100, such as those using one of the workstations 16, also pose an intrusion threat. If an intruder were to gain access to one of the critical security-related devices such as the IDS 18 or the firewall 24 or any trusted computer from within or outside the target network 100, security on the network could be compromised.

In the present invention, security subsystem 50 is connected to network backbone 12 and linked to each of the network's devices by a secure link 52. Such a secure link may be established through an encrypted communication protocol such as Secure Sockets Layer (SSL). This ensures that communication between the security subsystem 50 and the other components of the target network cannot be intercepted by an intruder. A similar secure link 54 is established as a virtual private network (VPN) tunnel between the security subsystem 50 and a master system 60 connected to a remote network 110. Although the remote network is shown having its own firewalls 62, servers 66, and router 68, the ultimate configuration of remote network 110 is not critical beyond secure link 54 connecting security subsystem 50 and master system 60. However, secure links 55 may be established between a device such as a network scanner 63 and a router 26 or remote user 21 on network 100. Secure link 54 ensures that communication between the two networks cannot be intercepted by an intruder. Therefore, there should be no other direct connection between target network 100 and remote network 110 except over a secure link.

Preferably, the security system defined herein is embedded as a software package and implemented on computers comprising at least a master system and the security subsystem.

During operation, security subsystem 50 monitors the activities of the devices of the target network 100. Particularly, the critical security-related functions of IDS 18 and firewall 24 are tested. The particular method employed by security subsystem 50 in testing these devices is not critical, however, the above mentioned approach employing simulated attacks on the components would be suitable.

Upon testing the devices, if the integrity of a device on target network 100 cannot be verified, security subsystem 50 reacts. For example, if IDS 18 has been identified by the subsystem as not reacting properly to attacks on it originating from the internet, appropriate countermeasures could include generating an alert, cutting off or restricting access to the network at firewall 24, or stopping an application. If instead, the firewall is determined not to be functioning, appropriate action might include disabling access to any servers 14 holding sensitive date. In one possible configuration of the present invention, security subsystem 50 reports network device status to master system 60 which processes the information, and decides on further action. In an alternate configuration, security subsystem 50 is responsible for implementing countermeasures or actions directly. In both cases, however, the results of every test are passed to through any layers of hierarchy to the master system 60 where they are stored for analysis.

The system of the present invention can also help thwart ongoing attacks and is uniquely suited to do so. In another preferred embodiment of the present invention, master system 60 hierarchically supercedes security subsystem 50. As such, the activities of security subsystem 50 are defined as a child process of master system 60 and are subordinate thereto. Although information preferably flows both ways between master system 60 and security subsystem 50 in this embodiment, the master system in this embodiment does not take direction from the subsystem, but would instead send direction to subsystem 50.

As noted in the discussion of the prior art, non-hierarchical security systems are connected directly to a target network and are inherently susceptible to attacks on that network and are unable to view security alerts from across the enterprise. This is in contrast to the present embodiment wherein, even if completely subverted during an attack on target system 100, security subsystem 50 would not result in a takeover of master system 60. The benefit of this configuration is that the master system would still be able to carry out its function. For example, if master system 60 is configured to sound an alarm when security subsystem 50 no longer responds to it, there would be no way, in this embodiment, for intruders on target network 100 to remotely shut down master system 60 because the master system will not respond to any instructions issued from a subordinate system. Although master system 60 may lose control of the target network, it is not in danger of being taken over by it. Additionally, if the link 54 between master system 60 and security subsystem 50 is severed or compromised, instructions may be routable instead through secure links to additional master servers at disparate locations.

In yet another embodiment of the present invention, remote network 110 is connected through router 70 to an open network such as the Internet. This enables master system 60 to send random pseudo-attacks to target network 100. The pseudo-attacks may mimic any of the actual attack signatures known by the master system to be detectable by the target network. If the expected reply is not received by the master system, an early indication of an intruder attack on the target network is indicated.

The process of detecting attacks on the target network will now be described in more detail. The security system provided by the present invention, employs a concept of "multiple views" to address many of the shortcomings in current security analysis systems. A view is defined as a subset of event information, within which searches are conducted to determine if a particular event or combination of events warrants further examination. The typical shortcoming of a typically implemented "view" system, is the scope of the events contained within a view to be studied. Views are typically implemented as FIFO event queues, and events are aged out based on the total number of events received, thus allowing an attacker to exploit this window by providing adequate spacing between the phases of an attack.

To improve upon the typical implementation, the present system deploys multiple views, each comprised of different subsets of event information. These multiple views provide a mechanism to retain specific event information long after it would have been purged from a system with a single event view. Correspondingly, a view analyzer exists for each view to provide the event correlation for information contained within the view, and take the appropriate actions based on the analysis of the view information.

In accordance with the preferred embodiment of the present invention, as an event is received by the security subsystem 50, it is added to a global view. After being added to the global view, the subsystem determines if additional views of the information are warranted. Additional dynamic views can also be created at any time based on the analysis of either the global view or other static or dynamic views. The system contains <n> views of information, with <n> expanding and contracting based on current and historical event information, system resource and memory utilization, and frequency of events.

Use of multiple views may be further explained using an example of an exploit on a Microsoft IIS web server. A typical attack on a vulnerable server is comprised of several phases: network scan, targeted server scan, buffer overflow exploit, backdoor installation, and further system compromise. A buffer overflow is detected by a network IDS, and results in a single security event. Once the initial exploit occurs, an attacker will use the compromise to install a backdoor program on the server, possibly generating another security event. Finally, the attacker will use this backdoor to further compromise the system. If the attacker spaces out the above phases of the attack over a long enough time, none of the disparate security devices (firewall, IDS, server) will detect the true nature of the attack because the security event identifying each phase may be aged out of the event queue before the next phase is detected, or they may not even detect the individual phase. Thus, the server can be compromised without any notifications from the network security devices. In the presently provided security system, upon receipt of the network scan event by the security subsystem 50, a new view will be spawned for events affecting that server. When the backdoor event is received, the initial event will still be in that spawned view, allowing the true nature of the attack to be determined. Preventive measures can then be taken before any further system exploit. As described further below, these preventative measures, or smart actions, can include scanning the system being attacked to determine if the attack can be successful against this particular system, and taking appropriate measures to defend the system. Additional smart actions may include firewall rule changes, initiating port scans, or implementing countermeasures (disabling account, triggering packet captures of traffic, etc.).

In accordance with the preferred embodiment, the security system may also include a "fixed" dynamic view, i.e., the system scan view. As the security system continually determines the effectiveness of e-security defensive measures through continual self-checks, as described above, the scan dispatcher mechanism forwards particular scan signatures to a system scan analyzer. Events matching predetermined parameters of the system's scan are placed in the scan view upon receipt by the security subsystem 50. This allows the provided security system to determine not only if the system is working properly by the receipt of scan event information, but also, by checking for deviation from the scan signature, to determine if a system is spoofing a target's IP address to covertly assess a system's weakness.

Several views may be created that, while dynamic, are somewhat 'fixed' in nature. Events from groups of devices may be placed into views based on their priority (i.e. production, development, test), and events that signal attacks may be placed in views based on their severity. This allows for groups of servers to be examined for trends in attacks, as well as determining the nature of all attacks occurring at a given time.

Figure 4:
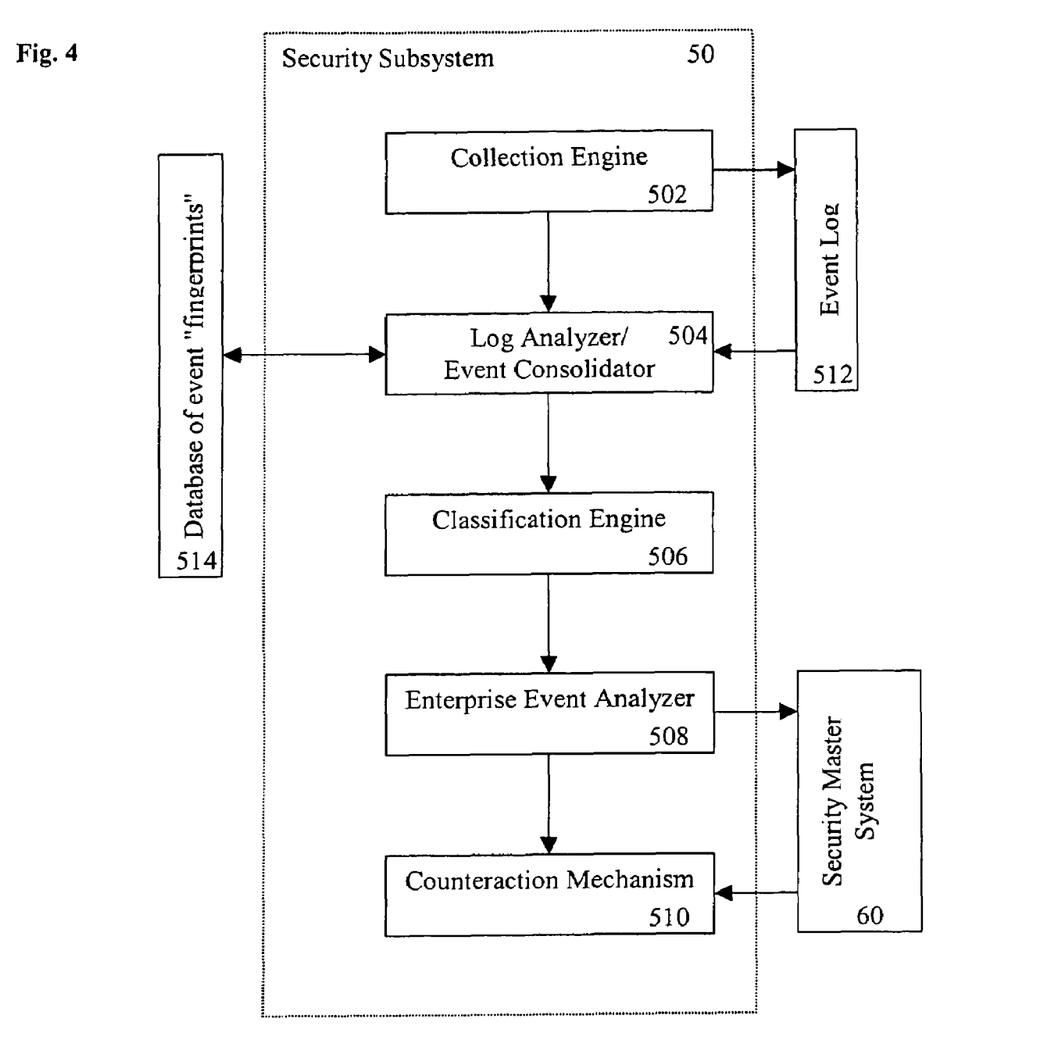
FIG. 4 is a flow chart representing the flow of information during the process of verifying the integrity of computer networks and implementing counter measures in accordance with the present invention.

Access to views are available between various system nodes in the system hierarchy. Because individual servers have the ability to send event and alert information upstream, this allows the security system to scale to large environments and handle high-impact security events. For example, in the event of a DDoS (distributed denial of service) attack, multiple event collectors 502 (described further below) may create multiple views and correlate and forward multiple alerts to the event analyzer 508 described below. Each alert can contain source and destination IP addresses, and alert information, which can be quite extensive in a DDoS scenario. In this case, the enterprise analyzer 508 can manipulate both the signatures and the definition of views on the target to allow the information to be more effectively aggregated, saving resources for detecting threats hidden within the noise.

Figure 3:
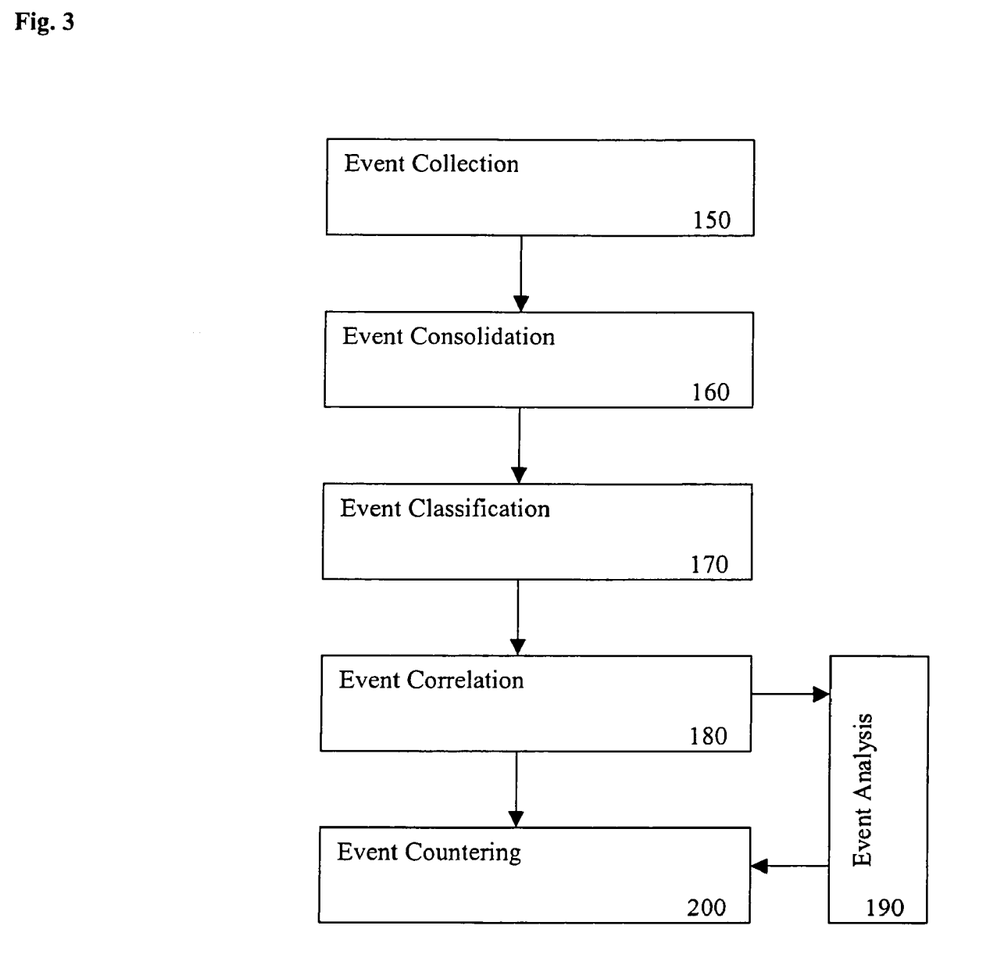
FIG. 3 is flow chart representing the flow of the process of verifying the integrity of computer networks and implementing counter measures in accordance with the present invention.

The process of verifying the integrity of computer networks and implementing counter measures is described with reference to FIGS. 3 and 4. As shown in FIG. 3, the process preferably starts with collection of disparate events from the target network (step 150). To accomplish the above step, the subsystem 50 is provided with a collection engine 502 (shown in FIG. 4) collecting the event-data from various devices on the target network. The collection engine 502 receives events from disparate servers and network devices, aggregates the information and stores it into the event log 512. Although it is shown as an independent entity, the event log 512 may be an element of the security subsystem or the master security system or both. The collection engine 502 is preferably designed to receive information from all common operating systems and security devices. In the preferred embodiment of the present invention, the collection engine 502 provides support for a secure syslog application, or any other similar application, to implement event collection. This allows the event data to be forwarded to the security subsystem by entering a single line into most UNIX servers. Syslog support is also included in most Cisco and Nortel network equipment. Through the use of add-on packages, NetWare, Windows NT and Windows 2000 servers can provide support for syslog as well. Other types of log collection may be utilized by the collection engine of the security subsystem. SNMP traps, downloading of log files through FTP, SMB disk shares, interactive telnet sessions or SSH sessions may all be supported by the collection engine. In an alternative embodiment, a separate collection engine may be implemented on each intrusion detection device of the target network.

Once the events have been received, the security system begins consolidating the events (step 160). The consolidation preferably takes place at the security subsystem 50. Because the process of consolidation is based on analyzing the event data collected by the collection engine, consolidation is performed by a log analyzer/event consolidator engine 504. To consolidate security events, each event is compared to a database of system and message "fingerprints" 514 to properly identify the source of the event message. All events are then mapped so that they are presented in the same standardized/normalized format. Similarly to the event log 512, the database 514 may be implemented on the master security system 60 and/or the security subsystem 50.

The event classification process (step 170) is accomplished by a classification engine 506. Once the log analyzer/event consolidator engine has uncovered the source of the event message, the system proceeds to classify the event by determining the overall meaning of the message and specific details necessary to make an evaluation of the significance of the event. The classification is preferably performed by an event classification engine 506 implemented on the security subsystem. If the classification engine 506 encounters an unknown type of event, it immediately uploads the event to the master system 60 for review. In a typical environment, IDS sensors, firewall logs and web logs create a large number of very similar events, many with a minimal security risk. The classification engine will combine these similar messages from different sources, reducing the level of redundancy within the data. Over time, classification engines create and store trending information regarding the types of events occurring most often. Classification engines can then process this information directly without sending these messages up the hierarchy leaving available resources for processing of other potentially important information. The database of event message-types may be incorporated into both the security subsystem and the master system.

In the preferred embodiment, the classification engine 506 is structured to allow a missed logon message from Windows NT to equate to a missed login from AIX or from any other operating system. While the database of event messages may be very extensive, each operating system, application, network device, and even major and minor version update create changes to the structure and meaning of event messages. To avoid security breach in connection with such event message variation, any event which can not be classified is queued for review. When an event is classified as high priority, it is immediately escalated to the security master system 60 and forwarded to a correlation queue of an enterprise event analyzer 508 for further analysis.

After the events have been consolidated and classified, they enter the correlation stage (step 180), which is performed by a hierarchy of event analyzers 508, which may include a plurality of network event analyzers, an enterprise event analyzer, preferably a part of the security subsystem 50, and a global event analyzer, preferably a part of the security master system 60. A network event analyzer analyzes data in various views, described above, looking for events exceeding predetermined thresholds. To reduce the number of security events, each event analyzer combines related security events into a single security ticket. Event analyzers can also use the results of vulnerability scans (discussed in more detail below) to prioritize detected security events. For example, an analyzer might determine that a particular event warrants additional scrutiny because a network device on which it was detected is particularly vulnerable to the type of attacks this event is associated with. The enterprise event analyzer compares events from one enterprise to events from another enterprise, allowing their true nature and significance to be understood. Different intrusion detection devices on the target network detect different signatures/aspects of the same intrusion. The enterprise event analyzer compares these different signatures to reveal the source and other characteristics of the intrusion. If the event is determined to be a security threat or a high priority event, it is uploaded to the master system 60 for review, as discussed below.

In the master system 60, each uploaded event is researched and analyzed by a global analyzer for its validity and threat to the protected resource (step 190). When an event is uploaded for review by the master system 60, a single ticket is generated for all security events determined to be related to the same attack, and a security engineer immediately begins researching the information in the ticket. During this time, the system may be conducting additional actions to assist the security engineer. Utilizing documentation of the target network's environment and engineer's own knowledge base, a determination of the risk is made, and a proper course of action is taken. The target network can be divided into a plurality of security zones. Different security zones might differ in their importance to the company and, thus, have a different level of security risk. Accordingly, each uploaded security event may be further classified by its level of security risk in accordance with the security zone where it was last detected. The master system 60 may also utilize risk threshold criteria against which all uploaded security events are compared. When an uploaded event exceeds a risk threshold, automatic countermeasures may be implemented.

Once the global or enterprise event analyzer, or security subsystem, correlates an event to a particular threat or security event, the event must be addressed (step 200). A counteraction mechanism 510 will be referred to as smart actions mechanism. Smart actions of the provided security system are issued by event analyzers and can counteract a threatening security event, for example, by increasing the level of detail recorded on specific actions, IP addresses or users. Smart actions can also counteract by making a change to a firewall rule or a router access control list to stop the offensive traffic. Automatic countermeasures, which can perform defensive actions based on pre-determined events, thresholds, or criteria established in each individual security profile, may also be part of the smart actions mechanism. Automatic countermeasures can include intensifying the observation of a particular user or session, alerting both the master security systems 60 and 50, and the designated personnel of the target network, and, in severe cases, automatically locking down a server or environment.

In another preferred embodiment of the present invention, several hierarchically arranged security subsystems may be provided on the target network. These subsystems are configured to allocate the processing load along the hierarchy. In this embodiment, when a lower-level security subsystem is inundated with messages, it can start offloading its correlation duties to a higher-level subsystem, while concentrating on consolidating and aggregating the lower-priority information it receives. This allows the higher-level subsystem to correlate information from more sources with its resources.

As set forth hereinabove, according to the present invention, it is possible to provide a method and apparatus for verifying the integrity of computers and computer networks that is independent of the network or computer being tested. In addition, by detecting early signs of intruder activity on a network, the present invention increases the likelihood that intruder attacks can be thwarted before they succeed.

When implemented on an individual computer, such as a single workstation 16 connected to an open network such as internet 30, the present invention functions similarly to prevent attacks on that computer originating from the open network. In the absence of network backbone 12 the functions of security subsystem 50 may be directly incorporated into an individual computer such as by software or peripheral hardware.

In another embodiment of the present invention, the provided security system can implement systematic Internet-based security assessments of the target network. The Internet-based assessment methodology incorporates checks and analysis from three distinct categories: vulnerability, visibility, and verification. Results of conducted assessments, as well as client configuration and agent information, are stored in updated network profiles. These profiles are accessed by event analyzers 508 when a particular security event is analyzed, so as to determine whether the detected attack can be effective against a particular network device. If the attack cannot be effective, the attack does not have to be addressed, thus allowing for a more efficient use of resources.

The security master systems 60 and 50 preferably conducts regular (e.g., monthly) vulnerability assessments of the target network. The vulnerability assessment is performed by conducting a series of external scans of routers, firewalls, servers, IDS sensors and other devices on the target network to uncover any bugs, vulnerabilities, configuration changes or human errors that could create opportunities for unauthorized access to the target network, systems and information assets. In addition to the external assessment, the security subsystem 50 may conduct an internal assessment of the target network that examines all aspects of the network's systems and procedures, such as general security practices, network vulnerability, firewall readiness, encryption strategy, access control (logical and physical), software versions, and virus protection, to set the extended baseline, or 'fingerprint', information.

In addition to regular vulnerability assessments, the system may also conduct alert-triggered assessments whenever a new vulnerability is discovered. Vulnerability assessments may also be conducted whenever the target network applies a services pack or deploys a new server. Such on-demand assessment ensures that the server is properly locked down before it is placed in production.

Network and firewall administrators often make changes to firewall (or any other port) rules to enable a new functionality or troubleshoot a problem. However, unintentional human errors and intentional security omissions may result from such rule change. To prevent these security problems, the master security systems 60 and 50 may conduct visibility scans which ensure that port rules changes did not make the target network more vulnerable to attacks. The master system uses a process of baselining to determine a target network's "fingerprint," i.e., the specific view of the target network from the Internet. Based on the created "fingerprint," any time a server, services, port or protocol is opened or closed through the firewall or server, the master system can generate a security alert, which is then analyzed by the master system. Each visibility scan determines whether only the ports which are supposed to be accessible are actually accessible. When the scan reveals an open port which is not supposed to be accessible, the system generates a security alert which is analyzed by the master system. During the visibility scan, the master system may try to "fool" target network devices to gain access to ports which are not supposed to be accessible. If such a port allows the access to the target network, the master system will immediately counteract by notifying the network's security personnel and possibly by changing rules of the affected port. The visibility scan also reveals "backdoors" intentionally left by hackers and allowing them to access the target network undetected. With over 65,000 possible ports available for each of target's IP addresses, both for TCP and UDP services, there are numerous services that need to be scanned. Therefore, the master system analyzes these services and preferably separates them into several categories based on the asserted risk to the target network. The highest risk ports are scanned at the most frequent time interval, for example, every five minutes.

In addition to the vulnerability and visibility scans, the master system 60 also verifies services that directly affect the target network's connectivity but are typically out of the network's control. This verification assessment ensures that company's domain name was not "hijacked." The master security system conducts a verification assessment of all information sources involved in network connectivity verifying information from a root domain name servers all the way through to a primary and a secondary web servers. The verification scan is performed for the entire IP address group of the target company. For example, when a target company has six IP addresses four of which are open and utilized and two of which are blocked and not accessible, the verification scan determines whether the blocked addresses remain unaccessible and whether the open addresses remain accessible. The assessment also includes a verification that when users are trying to access the network's website by typing "www-.company.com," they get to the proper website and their e-mail goes to the proper server. The master system also verifies information at the Whois database of the registration provider to ensure that contact and authorization information has not been changed. To protect target's website, the master system may also check whether the text, graphics and other information contained on the website was not altered by intruders. The master system may also test functionality of target's e-commerce and other on-line applications to assure that the entire web system is operational and any problems may be addressed immediately. The master system also tests and verifies external (Internet) routing information, DNS info, netbios information, access control, etc.

When implemented across a plurality of otherwise unrelated target networks, the present invention functions to prevent attacks according to the methods described herein on each target network individually. The advantage of this configuration is that security information may be coordinated across several networks without connecting the networks together.

The invention contemplates a hierarchy of master security systems 60 in addition to the security subsytem 50 connected via secure links, each level of master security system operating to monitor intrusion of the next lower level master security system.

Many different embodiments of the present invention may be constructed without departing from the sprit and scope of the invention. It should be understood that the present invention is not limited to the specific embodiments described in this specification. To the contrary, the present invention is intended to cover various modifications and equivalent arrangements included within the spirit and the scope of the claims.

The invention claimed is:

1. A security system for a computer network, the network having a plurality of devices connected thereto, at least some of the devices generating event messages when the device is under an attack, each event message having an associated event, the security system comprising: (a) a security subsystem connected to at least the devices in the network that generate an event message when under attack, the security subsystem including: (i) a collection engine which collects the event messages from the devices, and (ii) an event analyzer which analyzes the event messages to determine if any of the associated events exceed any predetermined thresholds; (b) a master security system which receives the associated events that exceed any predetermined thresholds; and (c) a first communication medium connected between the security subsystem and the master security system, the master security system receiving the associated events through the first communication medium.

2. The system of claim 1 wherein the master security system is located outside of the computer network.

3. The system of claim 2 wherein the master security system does not respond to any instructions issued from the security subsystem, the connection manner of the first communication medium and the inability of the master security system to respond to any instructions issued from the security subsystem thereby preventing a takeover of the master security system as a result of an attack on the network.

4. The system of claim 1 further comprising: (d) a second communication medium connected between the master security system and the network which enables data communication from the master security system to the network for issuing instructions to network devices.

5. The system of claim 4 wherein the instructions are issued if the first communication medium is severed or compromised.

6. The system of claim 1 wherein the security subsystem further comprises:
   (iii) a counteraction mechanism which causes selected countering events to occur regarding the network devices upon detection of selected events that exceed any predetermined thresholds.

7. The system of claim 6 wherein the countering event includes restricting or disabling access to the network or a device in the network.

8. The system of claim 1 further comprising: (d) an enterprize event analyzer which performs event correlation to correlate event messages received from different devices in the network to one particular threat or security event.

9. The system of claim 8 further comprising: (d) a hierarchy of event analyzers that work in conjunction with each other to correlate event message to one particular threat or security, the hierarchy of event analyzers, including: (i) the first event analyzer, and (ii) a global event analyzer associated with the master security system.

10. The system of claim 1 wherein the first communication medium is connected only to the security subsystem and to the master security system, and not to any of the network devices.

11. The system of claim 1 wherein the master security system is hierarchically independent from the security subsystem.

12. The system of claim 1 wherein the security subsystem is hierarchically subordinate to the master security system.

13. The system of claim 1 wherein the first communication medium is a secure link defined by a virtual private network (VPN) tunnel.

14. The system of claim 1 wherein the master security system further monitors whether the security subsystem responds to the master security system, the master security system taking action if no response is detected.

15. The system of claim 1 wherein the master system further comprises a pseudo-attack generator which generates attacks on the network, the security subsystem detecting such attacks and sending expected replies to the master system when its integrity is intact, the master system detecting whether the expected replies are received in response to a pseudo-attack to determine whether the integrity of the subsystem has been compromised.

16. A security system for a computer network, the network having a plurality of devices connected thereto, at least some of the devices generating event messages when the device is under an attack, each event message having an associated event, the security system comprising: (a) a security subsystem connected to at least the devices in the network that generate an event message when under attack, the security subsystem including: (i) a collection engine which collects the event messages from the devices, and (ii) an event analyzer which combines all event messages from the devices determined to be related to the same attack into a single security ticket; (b) a master security system which receives the security tickets; and (c) a first communication medium connected between the security subsystem and the master security system, the master security system receiving the security tickets through the first communication medium.

17. A security system for a computer network, the network having a plurality of devices connected thereto, at least some of the devices generating event messages when the device is under an attack, each event message having an associated event, the security system comprising: (a) a security subsystem connected to at least the devices in the network that generate an event message when under attack, the security subsystem including: (i) a collection engine which collects the event messages from at least the devices in the network that generate an event message when under attack, and (ii) an enterprise event analyzer which performs event correlation to correlate event messages collected by the collection engine to one particular threat or security event; (b) a master security system which receives the correlated event messages; and (c) a first communication medium connected between the security subsystem and the master security system, the master security system receiving the correlated event messages through the first communication medium.

* * * * *